(12) United States Patent
Thippesh et al.

(10) Patent No.: US 10,944,799 B2
(45) Date of Patent: Mar. 9, 2021

(54) IDENTIFICATION AND CONTROL OF APPLICATIONS AND MEDIA SESSIONS

(71) Applicant: Hewlett Packard Enterprise Development LP, Houston, TX (US)

(72) Inventors: Navaneetha Krishna Gowda Thippesh, Bangalore (IN); Brijesh Yadav, Bangalore (IN); Venkatesh Joshi, Bangalore (IN); Gopal Agarwal, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/072,303

(22) PCT Filed: Aug. 30, 2016

(86) PCT No.: PCT/US2016/049404
§ 371 (c)(1),
(2) Date: Jul. 24, 2018

(87) PCT Pub. No.: WO2017/131820
PCT Pub. Date: Aug. 3, 2017

(65) Prior Publication Data
US 2019/0036981 A1    Jan. 31, 2019

(30) Foreign Application Priority Data

Jan. 30, 2016   (IN) .............................. 201641003386

(51) Int. Cl.
*H04L 29/06*    (2006.01)
*H04L 29/12*    (2006.01)
*H04L 29/08*    (2006.01)

(52) U.S. Cl.
CPC .......... *H04L 65/1069* (2013.01); *H04L 29/06* (2013.01); *H04L 61/1511* (2013.01);
(Continued)

(58) Field of Classification Search
CPC . H04L 65/1069; H04L 61/1511; H04L 67/10; H04L 67/14; H04L 61/1541; H04L 67/22; H04L 29/06
See application file for complete search history.

(56) References Cited

U.S. PATENT DOCUMENTS 7,792,994 B1    9/2010  Hernacki
8,819,227 B1 *  8/2014  Keralapura ............. H04L 45/38
                                                      709/203
(Continued)

FOREIGN PATENT DOCUMENTS

CA         2714677 A1    8/2009
WO    WO-2009/102657 A1  8/2009

OTHER PUBLICATIONS

Chen-Chi Wu et al., "Detecting VoIP Traffic Based on Human Conversation Patterns," Jun. 6, 2008, pp. 1-16.
(Continued)

*Primary Examiner* — Soe Hlaing
(74) *Attorney, Agent, or Firm* — Hewlett Packard Enterprise Patent Department

(57) ABSTRACT

According to an example, an application initiating a communication session may be identified via a mapping of the application information with a pattern of interest included in a DNS server response corresponding to the application. Information regarding the communication session may be obtained and a determination may be made as to whether the communication session includes media data. If the communication session includes media data, control of the application and the communication session may be enabled via an interface.

17 Claims, 6 Drawing Sheets

(52) U.S. Cl.
CPC .......... *H04L 61/1541* (2013.01); *H04L 67/10* (2013.01); *H04L 67/14* (2013.01); *H04L 67/22* (2013.01)

(56) References Cited

U.S. PATENT DOCUMENTS

| | | | |
|---|---|---|---|
| 2006/0155862 A1* | 7/2006 | Kathi | H04L 45/38 |
| | | | 709/229 |
| 2007/0047438 A1 | 3/2007 | Malloy et al. | |
| 2008/0130539 A1 | 6/2008 | Lauer et al. | |
| 2010/0290353 A1 | 11/2010 | Barford et al. | |
| 2012/0159623 A1 | 6/2012 | Choi | |
| 2012/0230324 A1 | 9/2012 | Gong | |
| 2013/0077486 A1 | 3/2013 | Keith | |
| 2014/0013057 A1* | 1/2014 | Agrawal | H04L 67/2842 |
| | | | 711/126 |
| 2015/0215219 A1* | 7/2015 | Mattsson | H04L 47/2475 |
| | | | 370/401 |
| 2016/0007191 A1* | 1/2016 | Perras | H04L 61/1511 |
| | | | 370/328 |
| 2016/0007233 A1* | 1/2016 | Rao | H04L 47/762 |
| | | | 455/452.2 |
| 2016/0014002 A1 | 1/2016 | Bellis et al. | |
| 2017/0111244 A1* | 4/2017 | Stater | H04L 43/028 |

OTHER PUBLICATIONS

International Searching Authority, The International Search report and the Written Opinion, dated Dec. 6, 2016, PCT/US2016/049404, 11 Pgs.

* cited by examiner

IDENTIFICATION AND CONTROL OF APPLICATIONS AND MEDIA SESSIONS

BACKGROUND

Developments in networking technologies combined with myriad mobile client devices such as laptops, tablets, smartphones and wearable computing devices have led to an explosion in multimedia transmissions. Wi-Fi technologies have emerged that permit users to access the Internet wirelessly via their mobile client devices. Services such as VOIP (Voice over Internet Protocol) enable users to make voice and video calls over the Internet using various applications such as, WHATSAPP®, VIBER®, SKYPE®, and the like. In addition, various streaming services stream multimedia content to the users in real-time. Users can access these services via wireless networks of different sizes. A home of an individual may have a wireless network with a single router that hosts a few user devices. A larger establishment such as an office building, a business facility or an educational institution may have a more complex network with multiple routers hosting hundreds of devices.

BRIEF DESCRIPTION OF THE DRAWINGS

Features of the present disclosure are illustrated by way of example and not limited in the following figure(s), in which like numerals indicate like elements, and in which.

DETAILED DESCRIPTION

Figure 1:
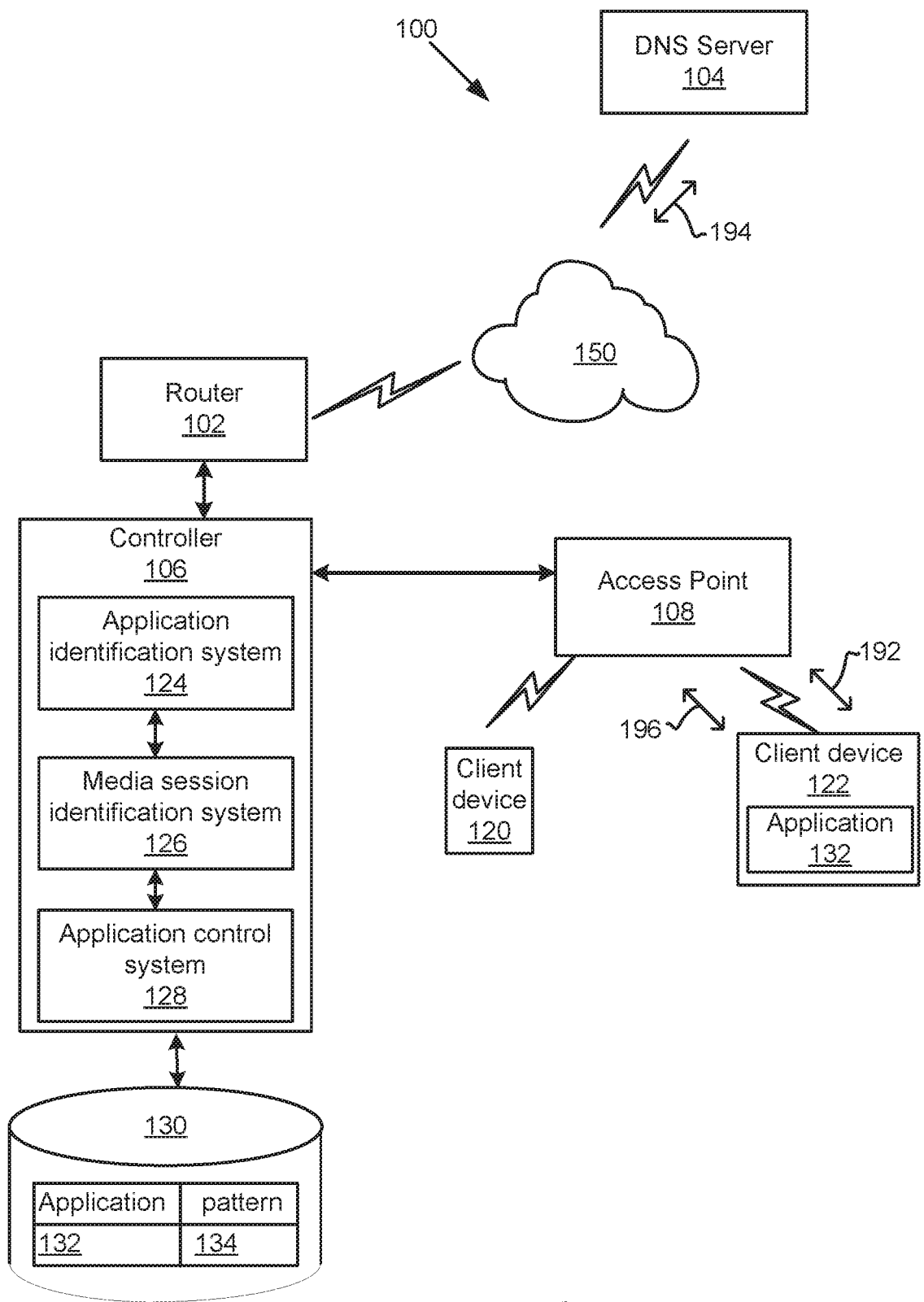
FIG. 1 is a block diagram of a system architecture of a computer network system which permits identification and control of applications, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Large wireless networks that support hundreds of user devices in business establishments generally employ network administrations to ensure good connectivity and safe access to resources. Many user devices trying to access services through a network such as a wireless LAN (Local Area Network) may result in congestion of the network traffic thereby affecting the network quality experienced by the users. Owing to the rapid proliferation of services and devices for accessing multimedia transmissions, effective systems and methods for gaining insight into the various multimedia applications active on a network and gaining visibility into call activities aids in prioritizing certain business-critical applications over others, determining the network resource utilizations of the applications and permitting or blocking certain applications. In order to achieve the aforementioned goals, Application Level Gateway (ALG) technique is used to snoop into signaling packets of the applications to build actionable intelligence. Therefore, the ALG technique needs the signaling to be transmitted as plain text without encryption. Many existing VOIP applications, for example, Jabber® or VOIP applications from Alcatel®, Avaya® are not encrypted.

However, new age VOIP applications such as Wi-Fi calling, Hangouts, Wire, Skype® for Business and the like are hosted on the cloud. Cloud computing and storage solutions enable ubiquitous, on-demand access to a shared pool of configurable computing resources. Information exchanged via the cloud based applications is transmitted over the public Internet and hence, the cloud-based applications encrypt the signals. As the signaling is encrypted, no actionable intelligence can be derived from the packets nor can any visibility, prioritization or application level control be enabled for the network administrator. The traditional ALG approaches were primarily designed for handling un-encrypted data exchanged over private networks which are deployed in-house. Such traditional techniques would fail to provide adequate metrics for determining the performance of the applications. Various features disclosed herein enable a user such as a network administrator to accurately identify particular applications which may exchange encrypted data thereby enabling monitoring and control of such applications by the network administrator.

FIG. 1 is a block diagram of exemplary system architecture of a computing network system 100 which permits identification and control of applications as discussed herein. The computing network system 100 is illustrated as including a plurality of network devices, such as a controller 106, a router 102 and an access point (AP) 108. Although only a single controller, router, and AP are illustrated, the network system 100 may include one or more of each of the different network devices consistent with the discussion herein. In one example, the controller 106 supports devices such as router 102 and the AP 108 to enable communication channels within the network system 100 that allow sharing of resources and information. In one example, the controller 106 provides networking across wireless and wired network connections, VPN connections, and remote services, and integrates networking and security functions into the network infrastructure and user experience. The network system 100 further includes one or more client computing devices 120 and 122 coupled to the network 150 via the AP 108, to access services through the controller 106.

The network 150 may be a communication network such as the Internet. In one example, the controller 106 or a disparate network management server (not shown) executes network management applications. For example, the controller 106 may provide manual or automated network management services to manage various aspects affecting the network, such as managing the radio frequency environment, controllers, wired infrastructure, and access points. Further, a user interface may be used to provide charts, tables, diagnostic information and alerts to network administrators.

In one example, a user may access a service such as a VOIP voice or video call via an application 132 that is being executed on the client device 122. When the user initiates the application 132 for accessing the service, a DNS (Domain Name System) request 192 is initially sent out by the client device 122 in order to locate a server on the network 150 that provides the service associated with the application 132. The router 102 may transmit the request 192 to the network 150 and a DNS server 104 may provide a response 194 to the request 192. The response 194 from the DNS Sever 104 may have a pattern of interest 134 that is peculiar or unique to the application 132. More particularly, the pattern 134 may have information, for example, the IP address and a port number of the server that provides the service. In one example, the pattern 134 can be obtained by parsing the response 194 from the DNS server 104.

An application identification system 124 which may be executed on the controller 106 in one example, records the information associated with the request 192 and response 194 in a database 130 coupled to the controller 106. More particularly, the information regarding the application 132 mapped to the pattern 134 from the server response 194 is recorded to a database 130. Generally well-defined application names may be used in the DNS request/response strings. Therefore, the database 130 may be pre-populated with well-defined, commonly used application/service names. In addition, the database 130 may receive new application or service names as the new applications and services begin to utilize the network system 100. The database 130 may be stored on the controller 106 or may be remotely located while being communicatively coupled to the controller 106. In an example, the application identification system 124 may initially verify that the information regarding the application 132 and its associated pattern 134 is not already stored in the database 130 prior to the information regarding the application 132 being stored in the database 130.

Subsequently, when an application 132 initiates a session 196, the media session identification system 126 may obtain information regarding the session 196 to determine if the session 196 is a multimedia session that transmits not only text data but also audio and/or video data. The media session identification system 126 may employ media classification algorithms such as but not limited to, the Media Classification Algorithm available from ARUBA NETWORKS® to determine if the session 196 is a media session. The output from the media session identification system 126 may be indicative of whether or not the session 196 is a media session. If the media session identification system 126 identifies that the session 196 is a media session, the metadata regarding the session 196 may be forwarded to the application control system 128. In one example, metadata regarding the session 196 may include the 5-tuple details such as the source IP (Internet Protocol) address, source portion, destination IP (Internet Protocol) address, destination port and the transport layer protocol. Based on the application information included in the database 130, the application control system 128 may identify not only the application 132 but also the session 196 associated with the application 132. The application control system 128 may thus gain insight into resource utilization by the application 132. Based on the identity of the application 132, the application control system 128 may implement various application control policies. For example, based on the identity of the application 132, the application control system 128 may permit or block the application or may prioritize the application 132 as being of business interest over other applications utilizing the network resources.

It should be appreciated that the application identification system 124 is shown as being included in the controller 106 in accordance with one example. In an example, the application identification system 124 may be executed by a disparate server in the cloud accessible to the controller 106 via the network 150. In some examples, other devices such as the access point 108 or a disparate network management server may execute the application identification system 124.

In one example, the controller 106, the router 102, the AP 108, and the DNS server 104 are purpose-made digital devices each containing a processor, memory hierarchy, and input-output interfaces. Suitable processors may be used in the network digital devices. The memory hierarchy may include fast read/write memory for holding processor data and instructions while operating, and nonvolatile memory such as EEPROM and/or Flash for storing files and system startup information. Wired interfaces may include IEEE 802.3 Ethernet interfaces, used for wired connections to other network devices such as switches, or to a controller. Wireless interfaces may be WiMAX, 3G, 4G, and/or IEEE 802.11 wireless interfaces. In one example, controllers, switches, and wireless APs operate under control of a LINUX® operating system, with purpose-built programs providing controller and access point functionality. Each of the client computing devices 120 and 122 may also contain a processor, memory hierarchy, and a number of interfaces including a wired and/or wireless interfaces for communicating with the AP 108. The client computing devices 120 and 122 may be personal computers, handheld and tablet computers, smartphones, wearable computing devices, or the like.

Figure 2:
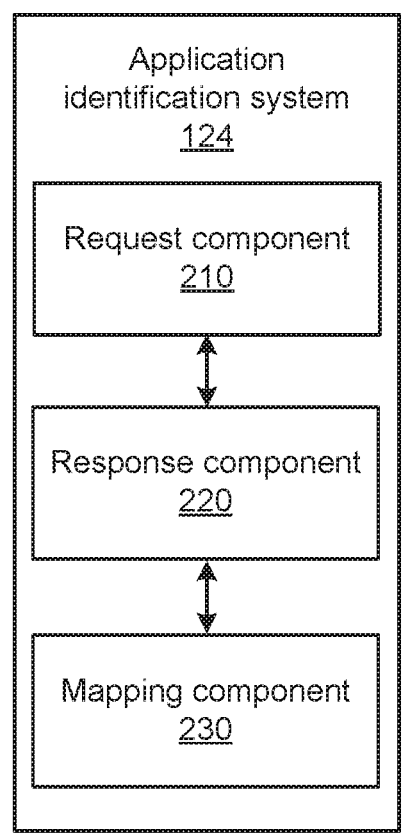
FIG. 2 shows a schematic diagram illustrating certain details of the application identification system, according to an example of the present disclosure.

FIG. 2 is a schematic diagram that shows certain details of the application identification system 124 in accordance with an example. As shown, the application identification system 124 may include a request component 210, a response component 220 and a mapping component 230. When the application 132 sends out the initial DNS request 192, the request component 210 may monitor for a server response to the request 192. Predetermined strings used by the application 132 to locate a server are programmed dynamically from the request component 210. For example, a T-Mobile Wi-Fi feature uses <sips._tcp.sba.sip.t-mobile.com> to locate the server providing the service. When a response 194 is received from the DNS server 104, the response component may snoop into the DNS packets to identify a pattern of interest 134.

In an example, the pattern of interest 134 may include information such as the IP address and port number of the server providing the service requested by the application 132. The IP address may be obtained from the A (Address) record response and the port number from the SRV (Service) response respectively. The mapping component 230 may build a table that records the name of the application 132 mapped to the information in the DNS response packets. Accordingly, the controller 106 may build a repository of application names mapped to the IP address and ports on which the service is hosted. It may be appreciated that only one application 132 is illustrated and discussed for brevity whereas in the real-world scenario tens or hundreds of applications (or more) may be using the controller 106 to access the Internet.

Figure 3:
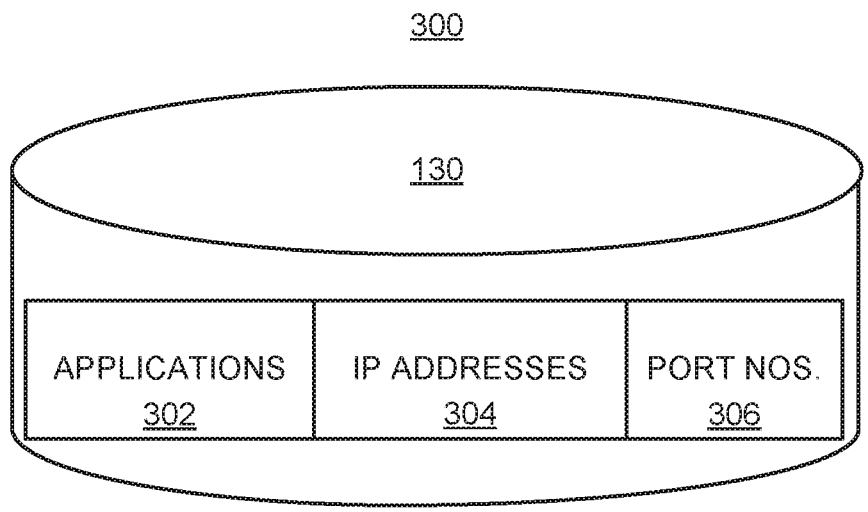
FIG. 3 shows a schematic diagram of the mapping information stored in the database, according to an example of the present disclosure.

FIG. 3 shows a schematic diagram 300 of the mapping information stored in the database 130, which may be used for the application identification, according to an example. The database 130 is depicted as including a mapping for information regarding the applications 302 utilizing the network resources and the corresponding IP address 304 and the port number 306 associated with the servers providing services corresponding to the applications 302. Well known application names may be pre-populated to the database 130. The patterns of interest 134 recognized from a DNS server responses include A record responses that provide the IP addresses 304. The SRV record responses provide the port numbers 306. The database 130 may receive new application names as the new application names are added to the ecosystem and begin to utilize the network resources.

Figure 4:
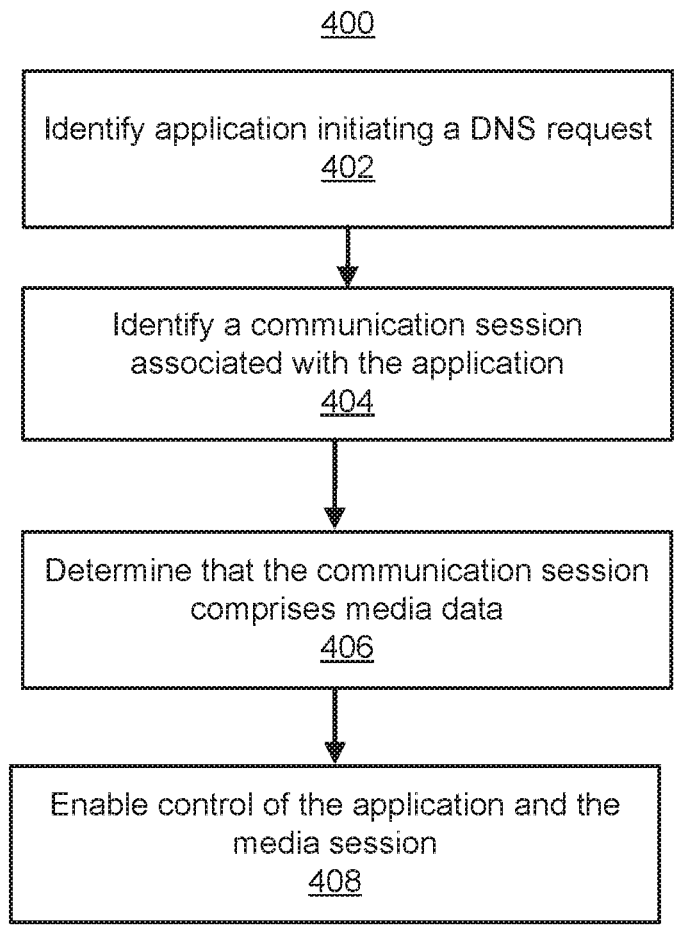
FIG. 4 is a flowchart that details a method to control applications, according to an example of the present disclosure.

FIG. 4 is a flowchart 400 that details a method to control applications according to an example of the present disclosure. The method may begin at block 402 at which an application initiating a communication session within a network may be identified. In an example, the applications that initiate communication sessions may be VOIP applications that use encrypted data. In one example, the database 130 is pre-populated with the application information, which is mapped to patterns of interest from DNS responses. Therefore, the application that initiated the communication session (e.g., initially sent a DNS request 192) may be identified from the mapping upon receiving a DNS server response 194. At block 404, information regarding the communication session associated with the application may be identified. Upon the DNS server 104 processing and responding to the initial DNS request 192 from an application 132, the application 132 may begin a communication session 196 with a server providing the service associated with the application 132.

At block 406, a determination may be made that the communication session transmits media data and hence forms a media session 196. In one example, the application 132 may be an instant messaging application that also permits audio and video calling. Accordingly, the media session 196 that transmits one or more of the audio and the video data may be commenced. Further, the application 132 and the media session 196 may be monitored for implementing various, network policies. In addition, at block 408, control of the application and the media session may be enabled via an interface, for instance, by the network administrator. In one regard, the identification of the applications and their related media sessions enables the controller 106 to gain insight into their bandwidth utilization. It also enables the controller 106 to provide the ability to permit or block applications by a network administrator. For example, an interface, such as a GUI (Graphical User Interface) or a textual interface, may be provided for the control of the applications by the network administrator. The identification of the applications and their related media sessions also provides the controller 106 with the ability to prioritize applications that are deemed business critical above the other applications. For example, if an application is identified as transmitting real-time voice and/or video data, then such application may be prioritized over other applications that may transmit text data.

Figure 5:
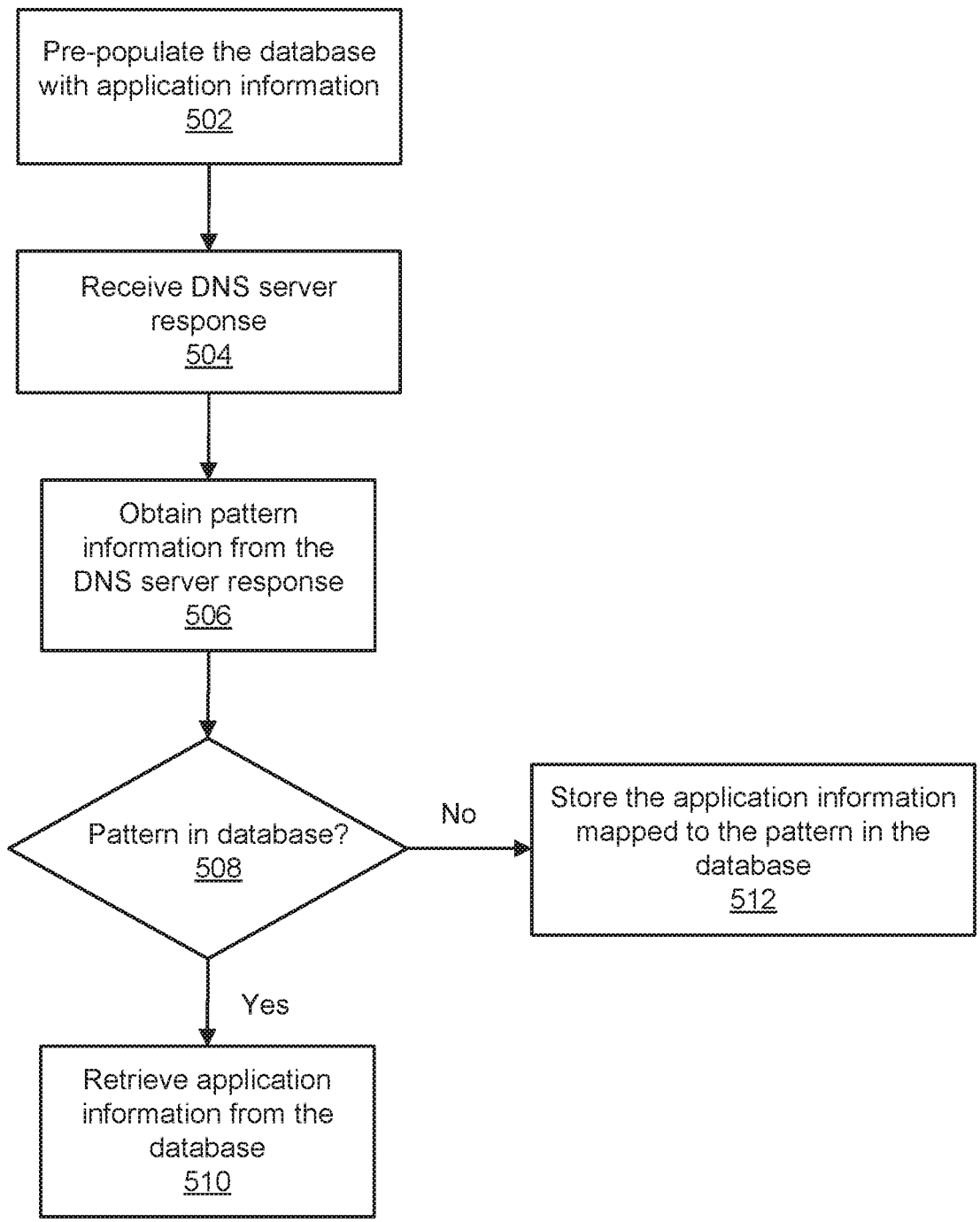
FIG. 5 depicts a flowchart that details a method of identifying and recording application data, according to examples of the present disclosure.

FIG. 5 details a flowchart 500 of a method of identifying and recording application data according to an example of the present disclosure. The method may begin at block 502 at which a database 130 may initially be pre-populated with well-known or commonly used application or service names. At block 504, a response 194 from the DNS server 104 to a DNS request sent out by an application 132 may be received.

At block 506, a pattern of interest may be obtained from the DNS server response 194. Generally, a string that may be unique to the application 132 or the service may be included in the DNS server response 194 and the pattern of interest 134 may be identified by parsing a string in the DNS server response 194. Hence, the pattern of interest 134 may be utilized in identifying the application 132 attempting to initiate a communication session. At block 508, a determination may be made as to whether an entry for the pattern of interest 134 identified from the DNS server response 194 exists in the database 130. If yes, the information regarding the application 132, such as the pre-populated application name, the IP address and the port number of the server providing services associated with the application 132, may be retrieved from the database 130, as indicated at block 510. However, if it is determined at block 508 that no entry exists in the database 130 for the pattern of interest 134, the pre-populated application name may be mapped to the pattern of interest 134 obtained from the DNS server response 194 and stored to the database 130, as indicated at block 512.

Figure 6:
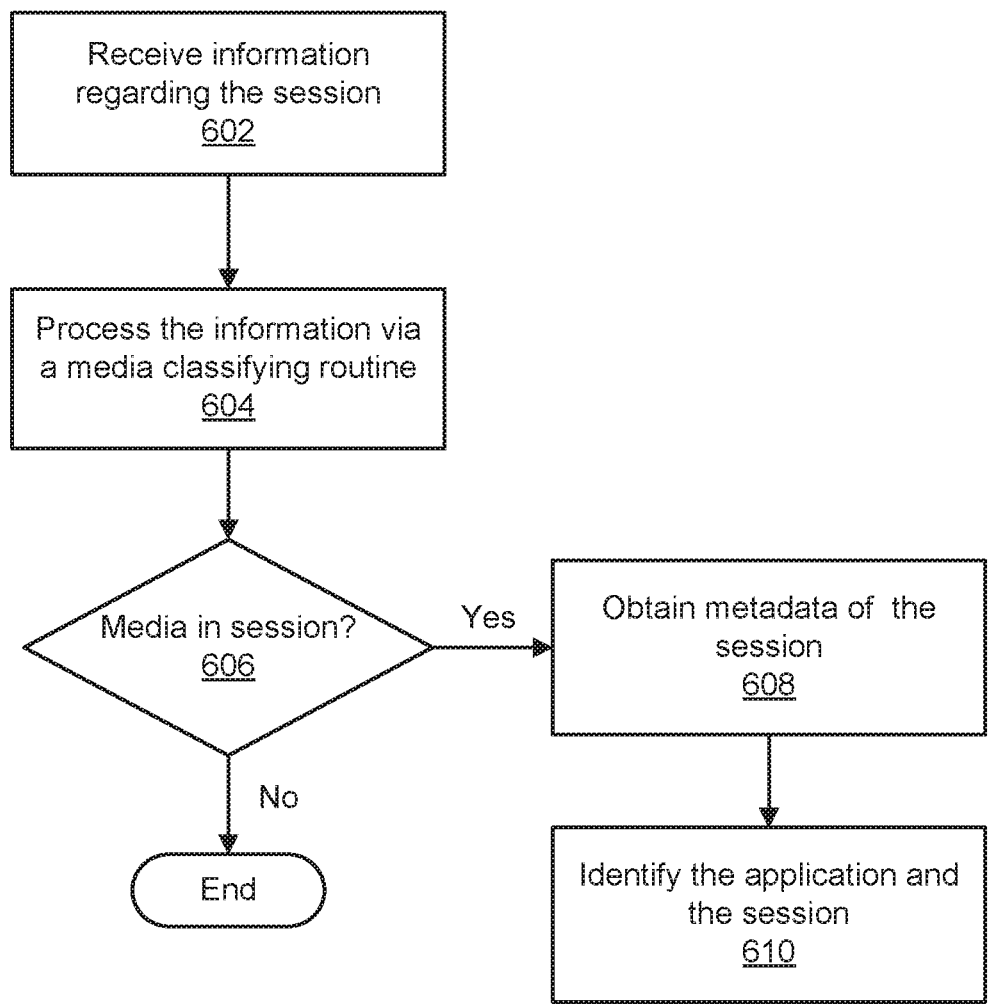
FIG. 6 is a flowchart that details a method of identifying a media session, according to an example of the present disclosure.

FIG. 6 is a flowchart 600 that details a method of identifying a media session according to an example of the present disclosure. The method may begin at block 602 at which the information regarding a communication session 196 that is commenced subsequent to the DNS request 192/response 194 exchange may be received. In one example, the application 132 may be a VOIP application that transmits encrypted data. Cloud based VOIP applications may utilize the Interactive Connectivity Establishment (ICE) procedures to establish the communication session 196, which may be a voice call for example. The ICE procedures use the STUN (Session Traversal Utilities for NAT) protocol messages on the sessions in which that media traffic is to be transmitted. The UDP (User Datagram Protocol) based STUN sessions may be processed via a media classification routine as indicated at block 604.

At block 606, based on the outcome of the classification routine, a determination may be made as to whether the communication session 196 is carrying media traffic. If it is determined at block 606 that media traffic is not present in the communication session 196, the method may terminate at the end block. If, however, it is determined at block 606 that media traffic is present in the session, metadata regarding the communication session 196 such as the 5-tuple details suggesting the origination of the call may be obtained, as indicated at block 608. Thus, the controller 106 may identify that a call has been placed on a particular 5-tuple. As the application mapping information is stored earlier on in the procedure as outlined in FIG. 5, the application 132 and its associated communication session 196 may be successfully identified as indicated at block 610. This may enable the controller 106 to implement various policies that may provide better service to the users of the network system 100.

Some or all of the operations set forth in the methods depicted in FIGS. 4-6 may be contained as utilities, programs, or subprograms, in any desired computer accessible medium. In addition, the methods may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 7:
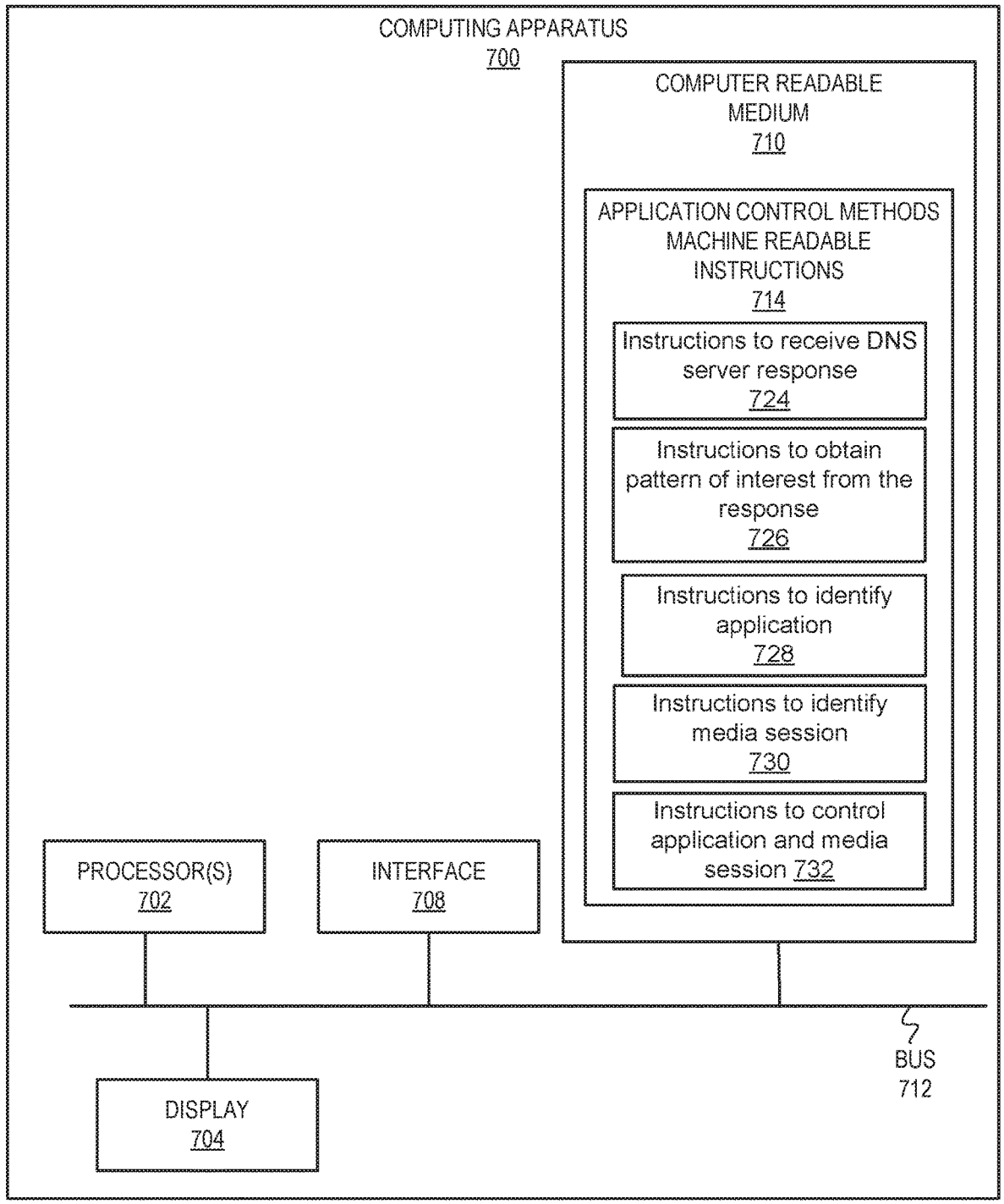
FIG. 7 is schematic representation of a computing apparatus, which may be equivalent to the computing apparatus depicted in FIG. 1, according to an example of the present disclosure.

Turning now to FIG. 7, there is shown a schematic representation of a computing apparatus 700, which may be equivalent to the controller 106 depicted in FIG. 1, according to an example. The computing apparatus 700 may include a processor 702, a display 704; an interface 708; and a memory 710, which may be a computer readable storage medium. Each of these components may be operatively coupled to a bus 712. For example, the bus 712 may be an EISA, a PCI, a USB, a FireWire, a NuBus, or a PDS.

The memory 710 may be any suitable medium that participates in providing instructions to the processor 702 for execution. For example, the memory 710 may be non-volatile media, such as an optical or a magnetic disk; volatile media, such as memory. The memory 710 may also store machine readable instructions 714 for application control methods, which, when executed may cause the processor 702 to perform some or all of the methods depicted in FIGS. 4-6. For example, the instructions 714 may include instructions to receive a response from a Domain Name System (DNS) server to a DNS request for service sent from an application 724, instructions to obtain a pattern of interest from the response 726, instructions to identify the application from a mapping of a pre-populated identity of the application and the obtained pattern of interest 728, instructions to identify a media session initiated by the identified application 730 and instructions to enable control of the identified application and the identified media session 732.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A computing apparatus comprising:
a processor;
a memory on which is stored instructions that are to cause the processor to:
receive a response from a Domain Name System (DNS) server to a DNS request for service sent from an application, wherein the application uses encrypted data;
obtain a pattern of interest from the response;
identify the application from a mapping of a pre-populated identity of the application and the obtained pattern of interest;
identify a media session initiated by the identified application, wherein identifying the media session includes the processor to:
process messages from one or more sessions established by the application, and
determine from the processing of the messages from the one or more sessions that the media session includes transmission of audio data, video data, or both; and
enable control of the application and the media session;
prioritize the application based at least in part on identification of the application and identification of the media session.

2. The computing apparatus of claim 1, wherein the pattern of interest comprises an IP address and a port number associated with a server providing the requested service.

3. The computing apparatus of claim 1, the memory further comprising instructions that cause the processor to:
prepopulate a database with names of applications using the network, the names of the applications comprising a name of the application that sent the DNS request; and
store to the database, the mapping of the pre-populated identity of the application and the pattern of interest.

4. The computing apparatus of claim 3, wherein to store, to the database, the mapping, the instructions are to cause the processor to:
map the name of the application that sent the DNS request to the pattern of interest.

5. The computing apparatus of claim 1, wherein identifying the media session includes the processor to:
process the messages from the one or more sessions established by the application via a media classification algorithm.

6. The computing apparatus of claim 5, wherein to identify a media session, the instructions are further to cause the processor to:
identify the media session from an output of the processing of the messages by the media classification algorithm.

7. The computing apparatus of claim 5, wherein to enable control of the application and the media session, the instructions are further to cause the processor to:
obtain metadata of the media session; and
enable associating of the media session with the application via the metadata.

8. The computing apparatus of claim 7, wherein the metadata of the media session comprises 5-tuple information including a source IP address, a source port, a destination IP address, a destination port and a transport layer protocol.

9. The computing apparatus of claim 1, wherein the identified application further provides for transmission of text in addition to transmission of audio data, video data, or both in the media session.

10. The computing apparatus of claim 9, wherein the identified application is an instant messaging application that permits one or more of audio calling and video calling.

11. A method, comprising:
identifying, by a processor, an application initiating a communication session on a network, wherein identifying is based on a mapping of information about the application along with a pattern of interest included in a Domain Name System (DNS) server response for the application, wherein the application uses encrypted data;
obtaining, by the processor, information regarding the communication session;
determining, by the processor, that the communication session comprises a media session based on the obtained information, wherein determining that the communication session is a media session includes the processor to:
  process messages from one or more sessions including the communication session established by the application, and
  determine from the processing of the messages from the one or more sessions that the media session includes transmission of audio data, video data, or both; and
enabling, by the processor, control of the application and the communication session via an interface;
prioritizing the application based at least in part on identification of the application and identification of the media session.

12. The method of claim 11, wherein identifying the application further comprises:
  pre-populating, by the processor, a database with a repository of names of a plurality of applications that utilize network resources, the plurality of applications including the application; and
  mapping a pattern of interest from a DNS server response to a name of the application in the repository.

13. The method of claim 12, further comprising:
  receiving, by the processor, names of additional applications not included in the plurality of applications; and
  storing, by the processor, to the database, the names of the additional applications.

14. The method of claim 11, wherein obtaining the information regarding the communication session comprises:
  obtaining, by the processor, 5-tuple details of the media session.

15. The method of claim 14, wherein enabling control of the application and the communication session further comprises:
  providing, by the processor, the 5-tuple details to the interface.

16. A non-transitory computer readable storage medium comprising machine readable instructions that when executed by a processor, cause the processor to:
  access a database comprising a mapping of a pre-populated identity of an application to a corresponding pattern of interest obtained from a Domain Name System (DNS) server response associated with the application, wherein the application uses encrypted data;
  identify the application from the mapping;
  subsequently identify a media session initiated by the application, wherein identifying the media session includes:
    processing messages from one or more sessions established by the application, and
    determining from the processing of the messages from the one or more sessions that the media session includes transmission of audio data, video data, or both; and
  enable implementation of network policies that control the application and the media session,
  prioritize the application based at least in part on identification of the application and identification of the media session.

17. The medium of claim 16 further comprising instructions that cause the processor to:
  receive the response from the DNS server to a DNS request for service sent by the application;
  parse the response from the DNS server; and
  obtain the pattern of interest from parsing the response.

* * * * *